US009098150B2

(12) United States Patent  (10) Patent No.: US 9,098,150 B2
Chapman et al.  (45) Date of Patent: Aug. 4, 2015

(54) POSITION SENSING SYSTEMS FOR USE IN TOUCH SCREENS AND PRISMATIC FILM USED THEREIN

(75) Inventors: Steven Chapman, Glenview, IL (US); Simon Bridger, Auckland (NZ)

(73) Assignee: Avery Dennison Corporation, Glendale, CA (US)

( * ) Notice: Subject to any disclaimer, the term of this patent is extended or adjusted under 35 U.S.C. 154(b) by 35 days.

(21) Appl. No.: 12/965,274

(22) Filed: Dec. 10, 2010

(65) Prior Publication Data

US 2012/0056807 A1  Mar. 8, 2012

Related U.S. Application Data

(60) Provisional application No. 61/406,644, filed on Oct. 26, 2010, provisional application No. 61/285,684, filed on Dec. 11, 2009.

(51) Int. Cl.
*G06F 3/042* (2006.01)

(52) U.S. Cl.
CPC .................................... *G06F 3/0428* (2013.01)

(58) Field of Classification Search
CPC .............................. G06F 3/0428; G06B 5/124
USPC ........................... 345/158–176; 359/529, 530
See application file for complete search history.

(56) References Cited

U.S. PATENT DOCUMENTS

| 2,407,680 | A | 9/1946 | Palmquist et al. |
| 3,541,606 | A | 11/1970 | Heenan et al. |
| 3,563,771 | A | 2/1971 | Tung |
| 3,758,193 | A | 9/1973 | Tung |
| 3,810,804 | A | 5/1974 | Rowland |
| 3,830,682 | A | 8/1974 | Rowland |
| 4,243,618 | A | 1/1981 | Van Arnam |
| 4,486,363 | A | 12/1984 | Pricone et al. |
| 4,507,557 | A | 3/1985 | Tsikos |

(Continued)

FOREIGN PATENT DOCUMENTS

| WO | 99/36805 | 7/1999 |
| WO | 02/101423 | 12/2002 |

(Continued)

OTHER PUBLICATIONS

ISR/WO issued in corresponding International Appl. No. PCT/US2010/059880 dated Jun. 22, 2011.

(Continued)

*Primary Examiner* — Premal Patel
(74) *Attorney, Agent, or Firm* — Avery Dennison Corporation

(57) ABSTRACT

A dual light-source position detecting system for use in touch screens is provided that utilizes parallax to determine the position of an interposing object, and a prismatic film that is brightly retroreflective over a broad entrance angle to enhance to accuracy of the parallax determination of position. The position detecting system includes at least one camera positioned to receive light radiation traversing a detection area and that generates a signal representative of an image; two spaced-apart sources of light radiation, which may be LEDs, or IR emitters positioned adjacent to the camera for outputting light radiation that overlaps over at least a portion of a detection area, and a prismatic film positioned along a periphery of at least a portion of the detection area that retroreflects the light radiation from the two sources to the camera.

28 Claims, 15 Drawing Sheets

(56) References Cited

U.S. PATENT DOCUMENTS

| | | |
|---|---|---|
| 4,588,258 A | 5/1986 | Hoopman |
| 4,601,861 A | 7/1986 | Pricone et al. |
| 5,138,488 A * | 8/1992 | Szczech .................. 359/529 |
| 5,200,851 A | 4/1993 | Coderre et al. |
| 5,450,235 A | 9/1995 | Smith et al. |
| 5,712,024 A | 1/1998 | Okusaki et al. |
| 5,742,411 A | 4/1998 | Walters |
| 5,936,770 A | 8/1999 | Nestegard et al. |
| 6,015,214 A | 1/2000 | Heenan et al. |
| 6,015,241 A | 1/2000 | Wiklof et al. |
| 6,406,758 B1 | 6/2002 | Bottari et al. |
| 6,406,798 B2 | 6/2002 | White et al. |
| 6,537,673 B2 | 3/2003 | Sada et al. |
| 6,767,102 B1 | 7/2004 | Heenan et al. |
| RE40,455 E | 8/2008 | Heenan et al. |
| 7,445,347 B2 | 11/2008 | Couzin |
| RE40,700 E | 4/2009 | Heenan et al. |
| 8,248,691 B2 | 8/2012 | Wei et al. |
| 2001/0048169 A1 | 12/2001 | Nilsen |
| 2002/0163505 A1 | 11/2002 | Takekawa |
| 2003/0203211 A1 | 10/2003 | Wei et al. |
| 2003/0203212 A1 | 10/2003 | Wei et al. |
| 2005/0178953 A1 | 8/2005 | Worthington et al. |
| 2005/0185279 A1 | 8/2005 | Mullen et al. |
| 2005/0190162 A1 | 9/2005 | Newton |
| 2005/0208239 A1 * | 9/2005 | Nielsen et al. ............... 428/34.1 |
| 2005/0248540 A1 * | 11/2005 | Newton .................. 345/173 |
| 2006/0007543 A1 * | 1/2006 | Couzin et al. ................ 359/530 |
| 2006/0108062 A1 * | 5/2006 | Smith et al. ................ 156/272.2 |
| 2007/0139775 A1 * | 6/2007 | Reich et al. .................. 359/515 |
| 2007/0223092 A1 * | 9/2007 | Moreau .................. 359/529 |
| 2007/0268582 A1 | 11/2007 | Smith |
| 2008/0049327 A1 * | 2/2008 | Smith .................. 359/530 |
| 2008/0103267 A1 | 5/2008 | Hurst et al. |
| 2009/0135162 A1 | 5/2009 | Wijdeven et al. |
| 2009/0185272 A1 * | 7/2009 | Smith .................. 359/530 |
| 2009/0295755 A1 | 12/2009 | Chapman et al. |

FOREIGN PATENT DOCUMENTS

| | | |
|---|---|---|
| WO | WO02/101423 | 12/2002 |
| WO | 2004-061489 | 7/2004 |
| WO | 2009-091681 | 7/2009 |
| WO | WO2009/091681 | 7/2009 |

OTHER PUBLICATIONS

Invitation to Pay Additional Fees issued in corresponding International Appl. No. PCT/US2010/059880 dated May 3, 2011.

CN Office Action issued in corresponding CN Appl. No. 200980109052.X dated Dec. 12, 2011.

IPRP issued in corresponding International Appl. No. PCT/US2009/030694 dated Apr. 26, 2010.

Invitation to Pay Additional Fees issued in corresponding International Appl. No. PCT/US2009/030694 dated May 4, 2009.

ISR/WO issued in corresponding International Appl. No. PCT/US2009/030694 dated Aug. 5, 2009.

Extended EP Search Report issued in corresponding EP Appl. No. 11 003 497.2 dated Aug. 2, 2011.

EP Communication issued in corresponding EP Appl. No. 09 702 040.8 dated Aug. 1, 2011.

Invitation to Pay Additional Fees issued in corresponding IA No. PCT/US2010/059880 dated May 3, 2011.

International Search Report and Written Opinion issued in corresponding IA No. PCT/US2010/059880 dated Jun. 22, 2011.

* cited by examiner

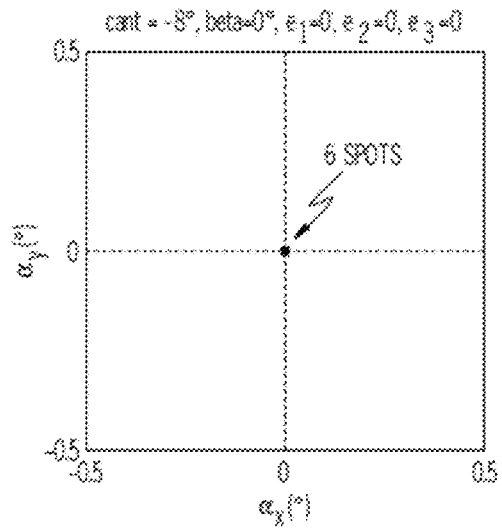
FIG. 10E
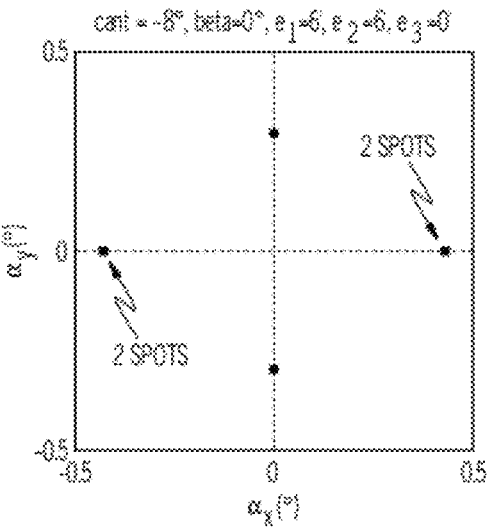
FIG. 10F
FIG. 10G
FIG. 10H

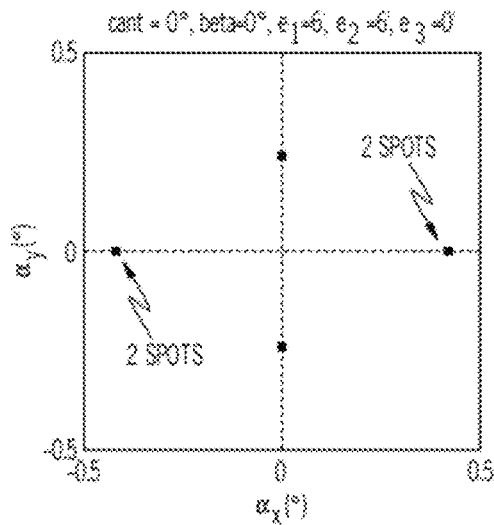
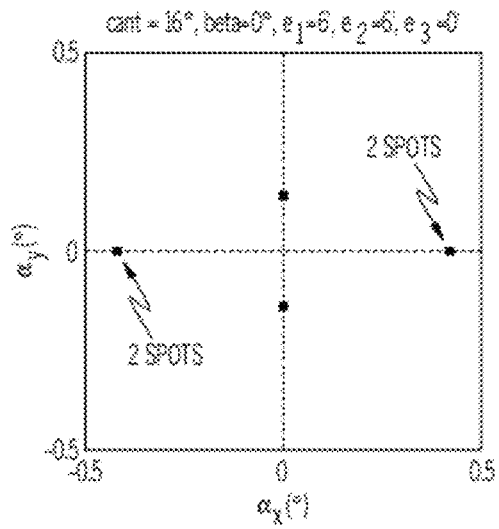
FIG. 11A          FIG. 11B
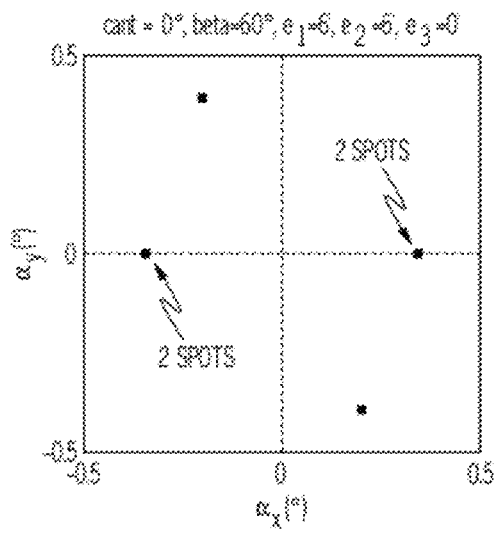
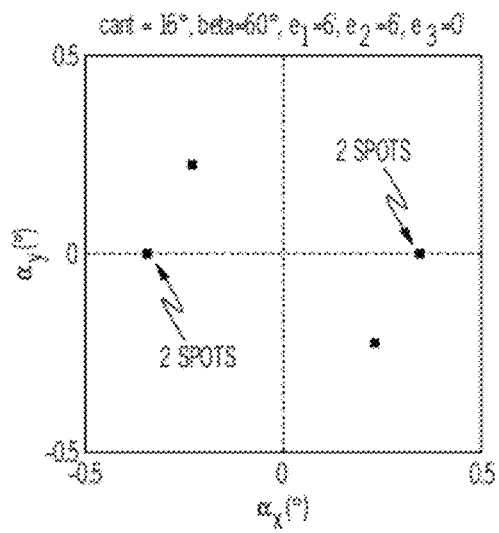
FIG. 11C          FIG. 11D

POSITION SENSING SYSTEMS FOR USE IN TOUCH SCREENS AND PRISMATIC FILM USED THEREIN

CROSS-REFERENCE TO RELATED APPLICATIONS

The present application claims the benefit of U.S. Provisional Application Nos. 61/285,684 filed Dec. 11, 2009, and 61/406,644 filed Oct. 26, 2010, both of which are incorporated herein by reference in their entireties.

FIELD OF THE INVENTION

The present invention relates generally to a system and method for detecting the position of an object within a touch screen or a position sensing system and a retroreflective or prismatic film used thereby. More specifically, the invention concerns a low profile position detecting system for use in touch screens or position sensing systems that employs a large spacing between source and detector in the plane of the screen, and a prismatic film that is brightly retroreflective at larger observation angles, and over a broad range of entrance angles.

BACKGROUND OF THE INVENTION

Some position detection systems related to touch screens sense the interruption of radiation (e.g., light) by an interposing opaque object (e.g., a finger, stylus, etc.). Such systems generally utilize radiation transmitters such as LEDs or IR emitters which are typically mounted in opposing corners of a same side of the touch screen. Each LED or IR emitter light source transmits a 90° fan-shaped pattern of light across the field of the touch screen, parallel to the viewing field surface.

A retroreflective sheeting material may be positioned around the perimeter of the active field of the touch screen, as disclosed in U.S. Pat. No. 4,507,557. The retroreflective sheeting material is generally arranged to reflect light received from the LED light sources back toward the originating source. Light incident on the front surface of the sheeting impinges on retroreflective elements, and is reflected back out through the front surface in a direction nominally 180 degrees to the direction of incidence. Digital cameras are located in the same opposing corners where the LED light sources are mounted to detect the retroreflected light that passes across the field of the touch screen and sense the existence of any interruption in this radiation by an opaque object.

One problem with the use of certain conventional retroreflective sheeting materials in touch screen applications and/or position detection systems is that dirt and/or moisture may penetrate the structure and adversely affect retro reflectivity of the retroreflective sheeting material. Another problem with conventional retroreflective sheeting material used in touch screen applications and/or position detection systems is difficulty in obtaining a uniform background throughout the area of interest (e.g., the detection area), against which the opaque object can be contrasted. Many conventional retroreflective sheeting material designs provide a non-uniform background and have portions, especially at or near the corner regions where the detected signal is very low. This makes it difficult to detect movement of the opaque object in such areas.

In operation, the position of the interposing object is typically determined by triangulation. When an interposing object such as a finger tip interrupts the pattern of light beams radiated from the LED light sources or IR emitters, a discrete shadow is created along a horizontal axis in the pattern of retroreflected light received by the two digital cameras. The digital cameras each generate a signal in which the discrete shadow registers as a dip in light intensity along a point of the horizontal axis of the camera field of view. A digital control circuit receives these digital camera signals and converts the horizontal position of the shadow into angles $\theta_1$, $\theta_2$ whose vertex originates with the digital cameras. Because the digital cameras are separated a known distance D at opposite ends of a same side of the touch screen, the y coordinate of the interposing object can be computed by the digital control circuit using the formula $y=D/(1/\tan\theta_1+1/\tan\theta_2)$, and the x coordinate may be computed as $x=y(1/\tan\theta_1)$.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

While such prior touch-screen configurations are generally adequate for their intended purpose, the applicant has observed that such touch-screen configurations can only reliably detect a single touch at one time. A double touch will produce two dips in each camera signal, one for each object. Since it may not be clear which dip in the second camera signal corresponds to a given dip in the first camera signal, the resulting signal data may be ambiguous, making it impossible to determine with certainty the coordinate location of the two interposing objects.

A first aspect of the invention is the collocation of both source and detector in the plane of the touch-screen. This allows the dimension of the camera perpendicular to the plane of the screen to be minimized. The location of the source along the horizontal axis of the camera also maximizes parallax effects.

A second aspect of the invention relates to a position detection system having cameras that utilize parallax to unambiguously determine the position of an interposing object. To this end, the position detection system comprises a camera positioned to receive electromagnetic radiation traversing a detection area that generates a signal representative of an image; two spaced-apart sources of electromagnetic radiation positioned adjacent to said camera for outputting electromagnetic radiation that overlaps over at least a portion of a detection area, and a prismatic film positioned along a periphery of at least a portion of the detection area that retroreflects said electromagnetic radiation from said two sources to said camera. In such a configuration, the camera generates a double-image of any opaque, interposing object in the detection area which in turn allows a digital processor to make a parallax-based computation of the location of an object in the detection area based on the angle and distance of the object from the camera lens. If two cameras are mounted in opposing corners of a same side of the touch screen and two dual radiation sources are used in combination with these cameras, an unambiguous determination can be made of the location of two simultaneously interposing objects. Alternatively, if only a single touch capability is desired, then only a single camera in combination with a dual radiation source is necessary.

The applicant further observed that retroreflective properties of prior art prismatic films limit the accuracy of the parallax-based location computation. The accuracy of such computations increases with the distance of separation between two sources of electromagnetic radiation. However, prior art prismatic films have a limited range of observation angles for efficient retroreflection. Consequently, the farther apart the two sources are spaced, the dimmer or darker one or the other or both of the parallax images becomes, and the smaller the signal-to-noise ratio becomes.

Accordingly, a third aspect of the invention is the provision of a prismatic film that is brightly retroreflective over an unusually broad range of observation angles along the horizontal axis of the film. To this end, the prismatic film of the invention includes a plurality of triangular cube corner retroreflective elements having dihedral angle errors $e_1$, $e_2$, and $e_3$ such that $e_1 \approx e_2 \approx 0$ and $e_3 \approx 0$ Preferably, $|e_1|$ and $|e_2|$ are between about 0.02° and 0.20°. About half of the plurality of triangular cube corner retroreflective elements may have dihedral angle errors $e_1$ and $e_2$ between about 0.02° and 0.20°, and the remaining half of the plurality of triangular cube corner retroreflective elements have dihedral angle errors $e_1$ and $e_2$ between about −0.02° and −0.20°. Additionally, the triangular cube corner elements may be canted edge-more-parallel between about 8° and 20°. Finally, to further enhance retroreflectivity over a broad range of entrance angle, the prismatic film may include a metallized layer disposed over at least a portion of the retroreflective substrate.

In a still further aspect of the present invention a prismatic film, is described and includes an unpinned prismatic film having a retroreflective substrate including a plurality of triangular cube corner retroreflective elements; and wherein the pattern of retroreflected light has a horizontal spread greater than a vertical spread at entrance angles of 0° and 60°. In addition, the spread in the horizontal direction is 1.5 times greater than in the vertical direction.

A prismatic film in one or more of the foregoing embodiments wherein the triangular cube corners elements are canted between −10° and −6° and in a further embodiment between −15° and −6°.

In a still further exemplary embodiment of the presently described invention, a prismatic film, includes an unpinned prismatic film having a retroreflective substrate including a plurality of triangular cube corner retroreflective elements. The retroreflective cube corner elements have dihedral angle errors $e_1$, $e_2$, and $e_3$ such that $e_1 \approx e_2 0$ and $e_3 \approx 0$, where the plurality of triangular cube corner elements are canted between −10° and −6°.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIGS. 10A-10H are spot diagrams of conventional cube corners canted edge more parallel at 0°, 16° and −8° for entrance angles (beta) of 0° and 60°;

FIGS. 11A-11D are spot diagrams of cube corners of the invention canted edge more parallel at 0° and 16° for entrance angles (beta) of 0° and 60°;

DETAILED DESCRIPTION OF THE INVENTION

Figure 1:
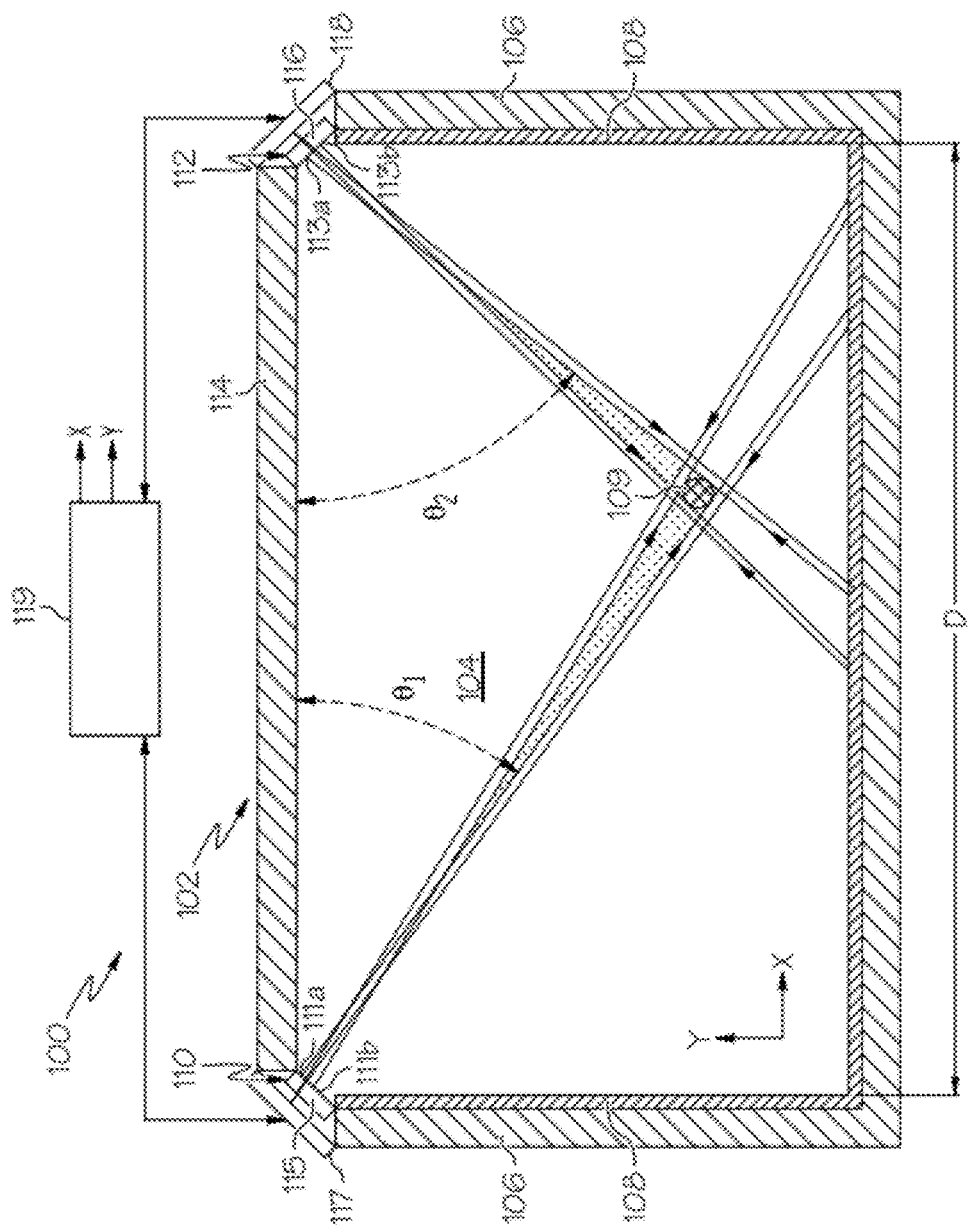
FIG. 1 is a schematic view of a touch screen system in accordance with aspects of the present invention.

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

One disadvantage of using arrays of prisms with positive cant in a touch-screen is the phenomenon of "sparkles." At certain entrance angles, light from the LED can enter the prismatic film, bounce off of just two of the cube corner faces and return to the camera aperture. This creates a sharp "spike" in the camera signal at that particular angle.

The presence of "spikes" in the camera signal is undesirable. So for many applications, it is desirable to choose a cant for which sparkles only occur at entrance angles not seen in the touch-screen geometry. Typical touch-screens see entrance angles ranging out to about 60°. The following graph shows the location of sparkles for touch-screens with the retroreflective strip perpendicular to the plane of the screen. For cants of +7° and +15.5°, one can read off the location of the sparkles: 45° and 30°, respectively. It can be seen that no sparkles occur for the entrance angles of interest (0°-60°, if the cant ranges from about −19° to −0.5°. In a similar manner, prisms with cant=+15.5° give a sparkle at an entrance angle of about 30°.

If the retroreflective film is tilted slightly, so as to no longer be perpendicular to the plane of the touch-screen, the location of the sparkle can change somewhat. To illustrate this, the following graphs show the retroreflective efficiency of triangular cube corners with various cants, as a function of entrance angle (β) and orientation angle ($\omega_s$). Overlaid in white are the angles at which a "sparkle" will occur. Overlaid in black are the angles encountered in the touch-screen geometry. The four black lines correspond to different tilts of the retroreflective film (−30°, −10, 10°, 30°. The graphs show that avoiding sparkles in the case of a tilted retroreflector requires a narrower range of cants. For example, a touch-screen with retroreflected film tilted 10° will avoid sparkles if the cant ranges from about −15° to about 0°.

U.S. Pat. No. 4,588,258 to Hoopman discloses retroreflective articles having a generally negative cant producing wide angularity, when using sets of matched pairs with the cube axes of the cubes in each pair being tilted toward one another.

For purposes of this application, certain terms are used in a particular sense as defined herein and other terms in accordance with industry accepted practice, such as current ASTM definitions, for example.

U.S. patent application Ser. No. 12/351,913, entitled "Retroreflector for use in touch screen applications and position sensing systems" filed Jan. 12, 2009 (having a common inventor and assigned to the same assignee as the present application) is hereby incorporated by reference herein as is necessary for a complete understanding of the present invention.

The term "cube" or "cube corner elements" (also "cube corner prisms" or "cube corners" or "cube corner retroreflective elements") as used herein includes those elements consisting of three mutually intersecting faces, the dihedral angles of which are generally on the order of 90 degrees, but not necessarily exactly 90 degrees.

The term "cube shape" as used herein means the two-dimensional geometric figure defined by the projection of the cube perimeter in the direction of the principal refracted ray. For example, a triangular cube has a cube shape that is a triangle.

The term "dihedral angle error" as used herein refers to the difference between the actual dihedral angle and 90 degrees. Each cube corner element has three dihedral angle errors, $e_1$, $e_2$, and $e_3$. For a canted cube corner with a cube shape that is an isosceles triangle, we adopt a convention whereby the label $e_3$ is assigned to the dihedral angle between the two faces with the same (but mirrored) shape.

The term "retroreflective substrate" as used herein means a thickness of a material having an array of either male or female cube corner elements formed on a second surface thereof. The first surface can be flat, or can be somewhat uneven in a pattern generally corresponding to the array of cube corner elements on the back surface. For male cube corner elements, the expression "substrate thickness" means the thickness of material on which the cube corner elements rest. For female cube corner elements, the expression "retroreflective substrate thickness" means the total thickness of material into which the female cube corner elements form cavities.

The term "cube axis" as used herein means a central axis that is the tri-sector of the internal space defined by the three intersecting faces of a cube corner element. The term "canted cube corner" as used herein means a cube corner having its axis not normal to the sheeting surface. Cant is measured as the angle between the cube axis and the sheeting surface normal. It is noted that when there is cant, a plan view normal to the sheeting surface shows the face angles at the apex not all 120 degrees.

The term "entrance angularity" as used herein means the angle between the illumination axis and the optical axis (retroreflector axis). The entrance angle is measured between the incident ray and the retroreflector axis. Entrance angle is a measure only of the amount by which an incident ray is angled to the retroreflector axis and is not concerned with the normal.

The term "face-more-parallel cant" (or "canted in a direction face-more-parallel or "canted in a face-more-parallel direction") and "edge-more parallel cant" as used herein refer to the positioning of the cube relative to the principal refracted ray. When the angles between the cube faces and the principal refracted ray are not all equal to 35.26°, the cube is "face-more-parallel" or "edge-more-parallel" depending upon whether the face angle with respect to the principal refracted ray that is most different from 35.26° is respectively greater or less than 35.26°. In the case of sheeting or other retroreflectors for which the principal refracted ray is nominally perpendicular to the front surface of the retroreflector, then for face-more-parallel cubes the selected cube face will also be more parallel to the reflector front surface than will any face of an uncanted cube.

An exemplary position detection system 100 in accordance with aspects of the present invention is illustrated in FIG. 1. FIG. 1 illustrates a plan view of a display 102 (e.g., a computer display, a touch screen display, etc.) having a screen area or viewing field 104 surrounded by a raised frame or border 106. While shown in the context of a computer display, the position detection system 100 may be used in any type of optical position detection system. The inner surface of the border 106, which is generally substantially perpendicular to the viewing field 104 of the display screen 102 is provided with a prismatic film (also referred to herein as retroreflective film 108). The prismatic film 108, which is discussed in detail below, provides a retroreflective surface around at least a portion of the viewing field 104 (also referred to herein as a detection field). That is, the prismatic film 108 provides a surface that reflects radiation from an originating radiation source back toward the originating source.

The composition of the prismatic film 108 may be applied directly to the frame 106 through use of an adhesive or other attachment means, or it may be manufactured first in the form of an adhesive tape, which is subsequently applied to the inner surface of the border 106. It is desirable to align the prismatic film in such a manner that a plane of maximum entrance angularity associated with the prismatic film is substantially parallel to the viewing field, the detection field and/or the display to optimize possible detection of an object in the area of interest. As discussed more fully below, the prismatic film 108 comprises a retroreflective film having multiple layers, wherein one of the layers includes a plurality of triangular cube corner retroreflective elements that reflect the incoming radiation. In an alternate embodiment, the film may include only a single layer that includes a plurality of triangular cube corner retroreflective elements. The triangular cube corners may have a negative cant ranging from between −10° and −6°.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The position detection system 100 shown in FIG. 1 further includes two sources of dual radiation 110, 112, each of which includes two spaced-apart point sources (or substantially point sources) 111a, 111b and 113a, 113b. The first source of dual radiation 110 may be disposed at one corner of the viewing field 104 and the second source 112 may be disposed at another corner of the viewing field 104. In a preferred embodiment, the first source and second sources of dual radiation 110, 112 are mounted along a same side 114.

As shown in FIG. 1, side 114 may not be provided with the prismatic film 108, which is provided on the other three sides of the display 102. One of ordinary skill in the art will readily appreciate that the precise location of the dual radiation sources 110, 112 may vary depending a variety of design considerations, including environment, application, etc. Likewise, one of ordinary skill in the art will appreciate that the entire perimeter of the viewing field may be surrounded by prismatic film 108.

The sources of dual radiation 110, 112 together illuminate the entire viewing field 104 with radiation, which extends in a direction parallel to the plane of the viewing field 104. The sources of dual radiation may provide any desirable spectrum of electromagnetic radiation. That is, the sources of radiation may be selected to operate in any desired frequency range or at any desired wavelength. For example, the sources may be a source of infrared radiation, radio frequency radiation, visible light radiation, light emitting diode (LED), laser, IR emitter, etc. In a preferred embodiment, the point sources 111a, 111b and 113a, 113b of the dual radiation sources 110, 112 are infrared light emitting diodes.

The prismatic film 108 provided around the perimeter of the viewing field reflects the infrared radiation back toward the respective originating sources as is indicated by the arrows within the viewing field. Thus, for example, the dual rays of infrared radiation originating from the point sources 111a, 111b of source 110 extend outward to the side of the display screen and are reflected 180° to return to the source 110, as shown in FIG. 1. Electromagnetic radiation is reflected backward toward its source by the prismatic film 108. One or more of the layers that overlie the triangular cube corner retroreflective elements of the prismatic film 108 function to allow most of the infrared radiation through (e.g., a double-pass transmission of about 74% to about 100%) and substantially block visible light, which gives the film an appearance of darkness. These aspects of the invention will be further discussed below.

Figure 2:
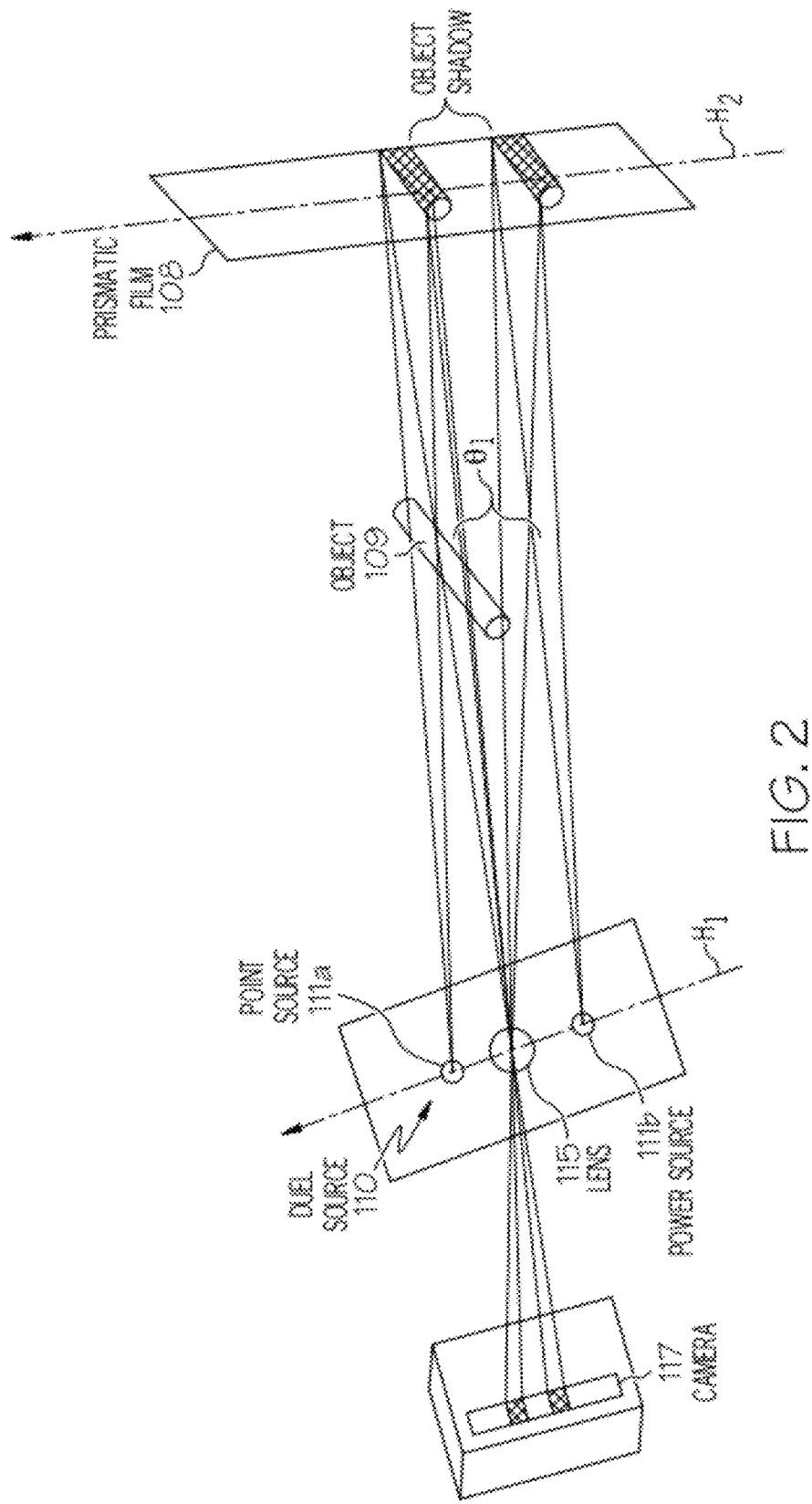
FIG. 2 is a cross-sectional view of the touch screen system of FIG. 1 in accordance with the present invention.

The point sources 111a, 111b and 113a, 113b of the dual radiation sources 110, 112 are symmetrically disposed along a horizontal axis $H_1$ on either side of lenses 115 and 116, respectively (as is shown in FIG. 2), for reasons which will become apparent hereinafter. The axis $H_1$ is coplanar with the longitudinal axis $H_2$ of the prismatic film 108. Lenses 115 and 116 are further disposed in front of cameras 117, 118, respectively. The lenses 115 and 116 focus the retroreflected radiation onto an image capturing device of the cameras 117 and 118. The point sources 111a, 111b and 113a, 113b are positioned a distance x away from the lenses 115, 116 as indicated in FIG. 2. In the preferred embodiment, the distance x is preferably between about 1 and 6 millimeters for touch screens whose longest side ranges from between about 17 to 30 inches for reasons discussed in detail hereinafter. More preferably, the distance x is between about 2 and 4 millimeters for touch screens of such sizes. The cameras 117, 118 may be line-scan cameras and/or area-scan cameras. The image capturing device of the cameras 117, 118 may include a charge coupled device (CCD) sensor that is formed by an array of photosensitive elements (e.g., pixels). A line scan camera generally acquires an image on a single line of pixels. An area scan camera, like a conventional camera, includes a CCD sensor (usually rectangular in form) of pixels that generates two dimensional frames corresponding to length and width of the acquired image. Reflected radiation passes through corresponding lenses (e.g., lens 115 or lens 116, depending on the location of the radiation source) and forms an image of an object detected by CCD sensor. The CCD sensor converts the detected radiation on a photo diode array to an electrical signal and outputs the measured amount. One single scanning line of a line scan camera may generally be considered as a one-dimensional mapping of the brightness related to every single point of an observed line. A linear scanning generates a line, showing on the Y axis the brightness of each point given in grey levels (e.g., from 0 to 255 levels for an 8-bit CCD sensor or from 0 to 1023 for a 10-bit CCD sensor). The outputs from the cameras 117, 118 can be processed by a control unit 119. The control unit 119 includes a digital processor that processes the output signals received from the cameras into signals indicative of the X and Y coordinate position of the object 109 via a parallax algorithm. One of ordinary skill in the art will readily appreciate that a scan taken from an area camera will generate a two-dimensional mapping of the brightness related to every point of the observed area.

The operation of the position detecting system 100 is best understood with reference to FIGS. 1 and 2, which will be explained first with reference to dual radiation source 110. Dual radiation source 110 emits two beams of infrared radiation from its pair of point sources 111a, 111b. The viewing field 104 has a prismatic film 108 along three sides of the frame 106, wherein both the point sources 111a, 111b are directed. The two different beams of infrared radiation generated by the point sources 111a, 111b strike an object 109 interposed within the viewing field 104 at different angles due to their 2x displacement from one another, creating two shadows of the object 109 located on either side of the object 109. The two beams of infrared radiation striking the prismatic film 108 are reflected back to the line scan camera 117. The infrared radiation passes through the lens 115 to the line scan camera 117, which in turn focuses an image on the CCD of the camera that includes an image of the interposing object 109 and the shadows flanking it.

The amount separation between the object 109 and the flanking shadows along the horizontal axis $H_1$ is linearly proportional to the distance between the object 109 and the point light sources 111a, 111b, being largest when the object 109 is closest to the point light sources 111a, 111b and smallest when the object 109 is farthest away. The amount of distance separation of the flanking shadows is also proportional to the distance 2x between the point light sources 111a, 111b. The distance between the object 109 and the front of the lens 115 can be accurately computed if the distance 2x is known via a parallax algorithm from the amount of observed separation between the object 109 and its flanking shadows. The proportional line scan camera generates a corresponding line image corresponding to the image along the longitudinal axis $H_2$ of the prismatic film 108, having a digitized brightness value that depends on the resolution of line scan camera for the various points along the line of the scanner. For any position in the line image that does not receive radiation a logical value 0 is generated. For example, if an opaque object 109, such as a stylus or a human finger, enters the viewing field, a shadow is cast on the lens and the corresponding line scan camera, which results in very little or no charge being detected by the line scan camera for that particular pixel or area of pixels. In locations where radiation is detected, the radiation discharges a corresponding CCD sensor associated with the line scan camera, which generates a substantially higher signal value depending on the resolution of the line scan camera. The combination of the image of the object 109 and its flanking shadows generates a dip or trough in the image signal generated by the camera 117 (or even three discrete dips or troughs) whose breadth along the axis $H_2$ can be converted into a distance between the object 109 and the point radiation sources 111a, 111b by the digital processor of the control circuit 119 via a parallax algorithm (or a look-up table generated by such an algorithm). Additionally, the angle $\theta_1$ can be determined by the digital processor of the control circuit 119 from the location of the midpoint of the dip (or group of dips) along the horizontal axis of the CCD of the camera 117. Hence the location of a single interposing object 109 can be completely determined by a single camera 117 in combination with the dual radiation source 110 and the digital processor of the control circuit 119. While the determination may initially be in polar coordinates, conversion to Cartesian X, Y coordinates is easily implemented. Moreover, if a combination of two dual radiation sources 110, 112 and line scan cameras 117, 118 are provided as are illustrated in FIG. 1 and operated simultaneously, then the X and Y position of two simultaneously interposing objects may be unambiguously determined, as only one combination of a camera and dual light source is necessary to determine the X, Y coordinates of a single interposing object.

Figure 3:
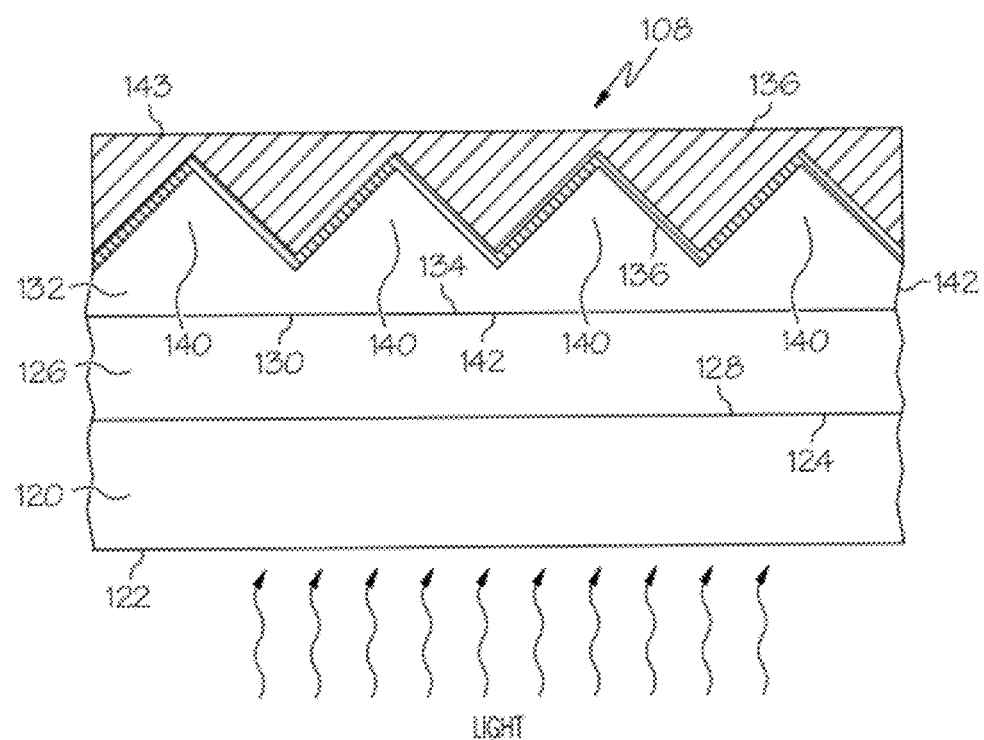
FIGS. 3 and 4 are cross-sectional views of prismatic film embodiments in accordance with the present invention.

The prismatic film (also referred to herein as the retroreflective film) 108 will now be discussed. Referring to FIG. 3, an exemplary prismatic film 108 in accordance with aspects of the present invention is illustrated in cross-sectional view. The prismatic film 108 includes a first substrate 120 having a first surface 122 and a second surface 124. The first surface 122 (also referred to as the front surface) of the prismatic film 108 is generally flat (and typically smooth). The second surface 124 is also generally flat and is secured to a second substrate 126.

The second substrate 126 has a first surface 128 and a second surface 130. As shown in FIG. 3, the first surface 128 of the second substrate 126 is generally flat (and typically smooth) and generally confronts the second surface 124 of the first substrate 120. The second surface 130 of the second substrate 126 is also generally flat and is secured to a retroreflective substrate 132.

The first and second substrates 120, 126 can be comprised of a material, such as a polymer that has a high modulus of elasticity. The polymer may be selected from a wide variety of polymers, including, but not limited to, polycarbonates, polyesters, polystyrenes, polyarylates, styrene-acrylonitrile copolymers, urethane, acrylic acid esters, cellulose esters, ethylenically unsaturated nitrites, hard epoxy acrylates, acrylics and the like, acrylic and polycarbonate polymers being preferred. Preferably, the first and second substrates are colored and/or have a dye distributed uniformly throughout the first and second substrates. In one embodiment, the first substrate 120 has a red dye distributed throughout and the second substrate 126 has a blue dye distributed throughout. In another embodiment, the first substrate 120 has blue dye distributed throughout and the second substrate 126 has a red dye distributed throughout. Both first and second substrates 120, 126 have dye distributed uniformly throughout. One of ordinary skill in the art will readily appreciate that aspects of the present invention include using any desirable color or combination of colors to obtain the desired functionality, aesthetic appearance, etc., discussed herein. For example, the substrates 120, 126 may have different colored dyes distributed throughout. See for example US published applications 20030203211 and 20030203212 (assigned to the same assignee as the present application) which are hereby incorporated by reference herein as is necessary for a complete understanding of the present invention.

The substrates are preferably chosen to be highly transparent in infrared wavelengths and non-transparent in visible light wavelengths, which will provide a substantially black appearance. The bright background provided by the film is preferably made to be as bright and uniform, as reasonably possible, to allow detection of an object 109 within the field of the prismatic film 108 (e.g., the viewing field 104).

The retroreflective substrate 132 has a first surface 134 and a second surface 136. As shown in FIG. 3, first surface 134 is generally flat (and typically smooth) and generally confronts the second surface 130 of the second substrate 126. The second surface 136 includes or otherwise defines a plurality of cube corner retroreflective elements 140 and may be confronted with an adhesive 143 for use in an application. The retroreflective substrate 132, including the cube corner elements 140 formed therein, can be comprised of a transparent plastic material, such as a polymer that has a high modulus of elasticity. The polymer may be selected from a wide variety of polymers, including, but not limited to, polycarbonates, polyesters, polystyrenes, polyarylates, styrene-acrylonitrile copolymers, urethane, acrylic acid esters, cellulose esters, ethylenically unsaturated nitrites, hard epoxy acrylates, acrylics and the like, with acrylic and polycarbonate polymers being preferred.

Figure 3A:
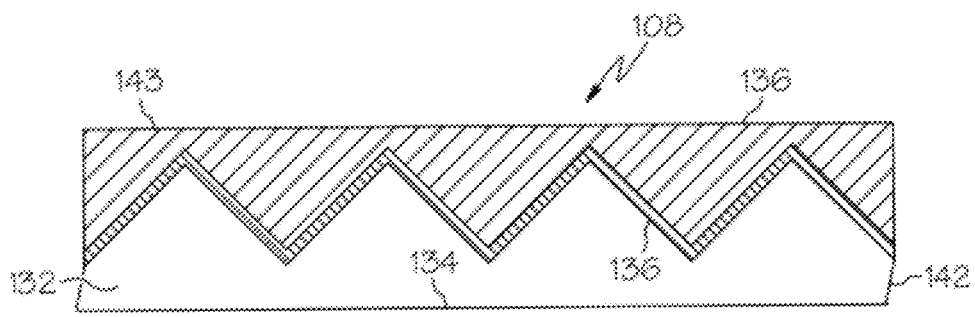
FIG. 3a is a cross sectional view of a prismatic film embodiment in accordance with the present invention.
Figure 4:
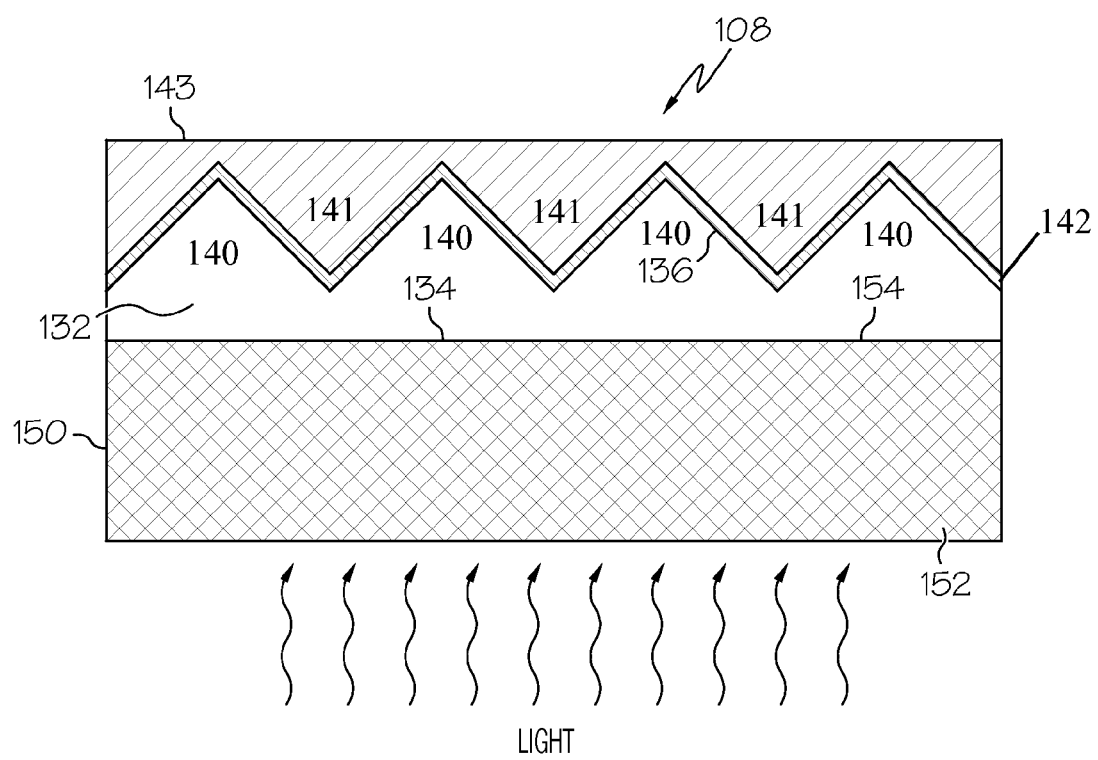

The prismatic film of FIG. 3a, provides a signal layer film as opposed to the multiple layer film as provided in FIGS. 3 and 4. For convenience, similar reference numerals are used in the description of the FIG. 3a embodiment. An exemplary prismatic film 108 in accordance with aspects of the present invention is illustrated in cross-sectional view. The retroreflective substrate 132 has a first surface 134 and a second surface 136. As shown in FIG. 3a, first surface 134 is generally flat (and typically smooth). The second surface 136 includes or otherwise defines a plurality of cube corner retroreflective elements 140 and may be confronted with an adhesive 143 for use in an application. The retroreflective substrate 132, including the cube corner elements 140 formed therein, can be comprised of a transparent plastic material, such as a polymer that has a high modulus of elasticity.

In another embodiment illustrated in FIG. 4, the first and second substrates 120, 126 may be replaced by a single substrate 150. The substrate 150 has a single dye layer film to absorb the visible light with a front surface 152 and an opposing back surface 154. The back surface 154 confronts the retroreflective substrate 132, as discussed above with respect to the second substrate. The front surface 152 is generally smooth. In one embodiment, the substrate 150 is colored black. Benefits associated with a single dye layer are to make the overall film structure thinner and increase uniformity of transmission through the single dye layer 150.

In one preferred embodiment, the retroreflective substrate 132, including the cube corner elements formed therein, is made of acrylic, e.g., an acrylic material having an index of refraction of about 1.49. Of course, other suitable materials having a higher or lower index of refraction can be employed without departing from the scope of the present invention. The cube corner elements can be formed within or as an integral part of the substrate using, for example, any of the methods described in U.S. Pat. No. 6,015,214 (RE 40,700) and U.S. Pat. No. 6,767,102 (RE 40,455) (assigned to the same assignee as the present application) which are hereby incorporated by reference herein as is necessary for a complete understanding of the present invention.

As is described more fully below, the refractive index of the substrate, the size and canting of the cube corner elements may be selected to provide a desired retroreflectivity and uniformity. While the present invention is being described with respect to cube corner elements that are formed integrally as part of the substrate, it is to be appreciated that the present invention is applicable to cube corner elements that are formed separately (e.g., by casting or molding) from the substrate and bonded to the substrate.

The plurality of cube corner elements 140 are metallized 142 with a suitable metal, such as aluminum, silver, nickel, gold or the like. Such metallization can be provided by depositing (e.g., sputtering or vacuum depositing) a metal film over the surfaces of the cube corner elements. The metallized cube corner side of the substrate can be coated with or otherwise embedded in an adhesive 143 (forming, for example a product similar to conspicuity tape). The metallization of the cube corner elements allows the display to be cleaned and otherwise not susceptible to contaminants and/or moisture that may have deleterious effects on the retroreflectivity of the retroreflective film 108. U.S. Pat. No. 7,445,347 (assigned to the same assignee as the present application) is hereby incorporated by reference herein as is necessary for a complete understanding of the present invention.

Figure 5:
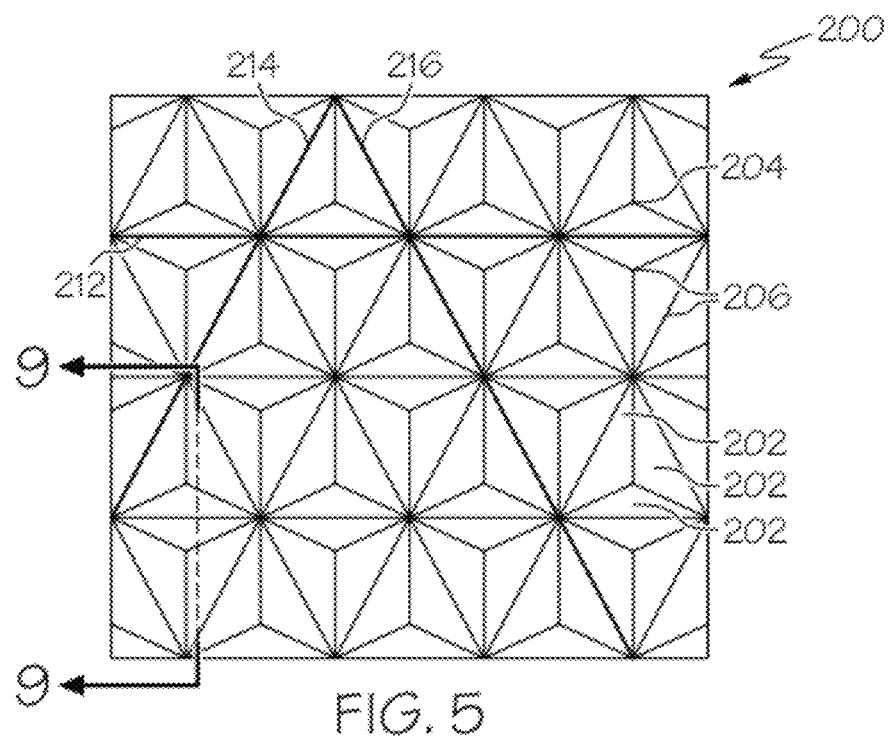
FIG. 5 is a plan view of prismatic film with an array of canted cube corner retroreflective elements as shown in FIGS. 3 and 4.

With reference now to FIGS. 5-8 and continued reference to FIG. 3, the retroreflective film 108 includes a plurality of individual cube corner elements 140 (FIG. 3) that are arranged in or otherwise formed as an array 200 (FIG. 5). Each cube corner element 140 is formed by three substantially, but not completely perpendicular faces 202 that meet at an apex 204. The faces intersect one another at dihedral edges 206. The angles at the dihedral edges 206, between the mutually intersecting faces 202 are commonly referred to as dihedral angles. In a geometrically perfect cube corner element, each of the three dihedral angles is exactly 90°. However, in the present invention, a specific pattern of errors is deliberately incorporated into two of the three dihedral angles in order to enhance the brightness of detected radiation retroreflected along the longitudinal axis of the prismatic film 108, as will be described in detail hereinafter.

Figure 6:
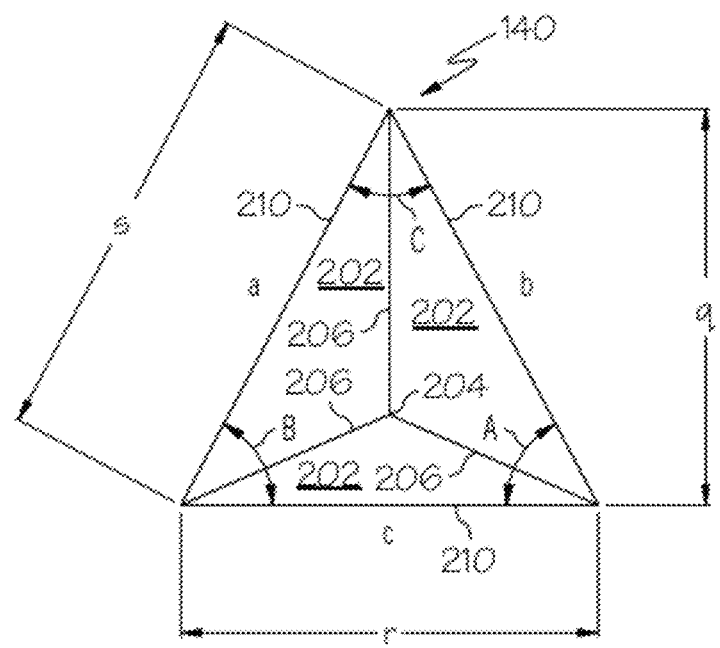
FIG. 6 is a plan view of an exemplary canted cube corner retroreflective structure in accordance with aspects of the present invention.

As depicted in FIG. 6, each cube corner element 140 has a triangular cube shape with three base edges 210. In the present embodiment, each cube corner element 140 has an isosceles triangle cube shape, where two of the base edges (e.g., base edges having lengths a and b) are approximately the same length. Alternatively, one or more of the cube corner elements 140 can have a non-isosceles triangle cube shape. Because base edges 210 of cube corner element 140 are linear and in a common plane, an array of such is defined by intersecting sets of grooves. As shown in FIG. 5, each cube corner element 140 is defined by three V-shaped grooves 212, 214, 216, which are each one member of three sets of grooves that cross the array 200 in an intersecting pattern to form matched pairs of cube corner elements. Normally all three sets of grooves are cut to the same depth (see, e.g., grooves 141 in FIG. 4), but one or more sets of grooves may be offset vertically (i.e., cut shallow or deep with respect to the others). Also, one of the groove sets can be offset horizontally, causing the cube shape to differ from a triangle. Such cubes are still considered triangular cube corners and are within the scope of this invention. In the embodiment illustrated in FIG. 6, faces adjacent sides a and b have a half groove angle of about 38.5 degrees (e.g., 38.5211 degrees), while the face adjacent side c has a half groove angle of about 28.3 degrees (e.g., 28.2639 degrees).

Figure 7:
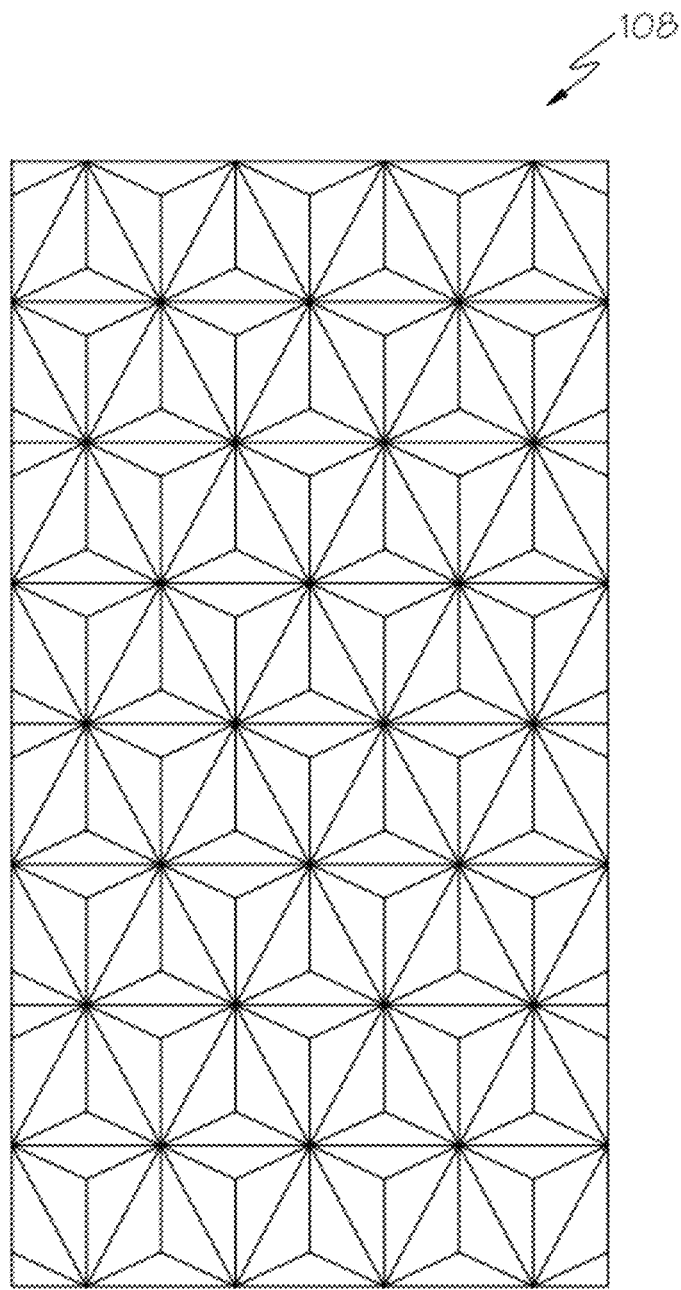
FIG. 7 is a plan view of unpinned prismatic film of canted cube corner retroreflective elements as shown in FIG. 6.
Figure 8:
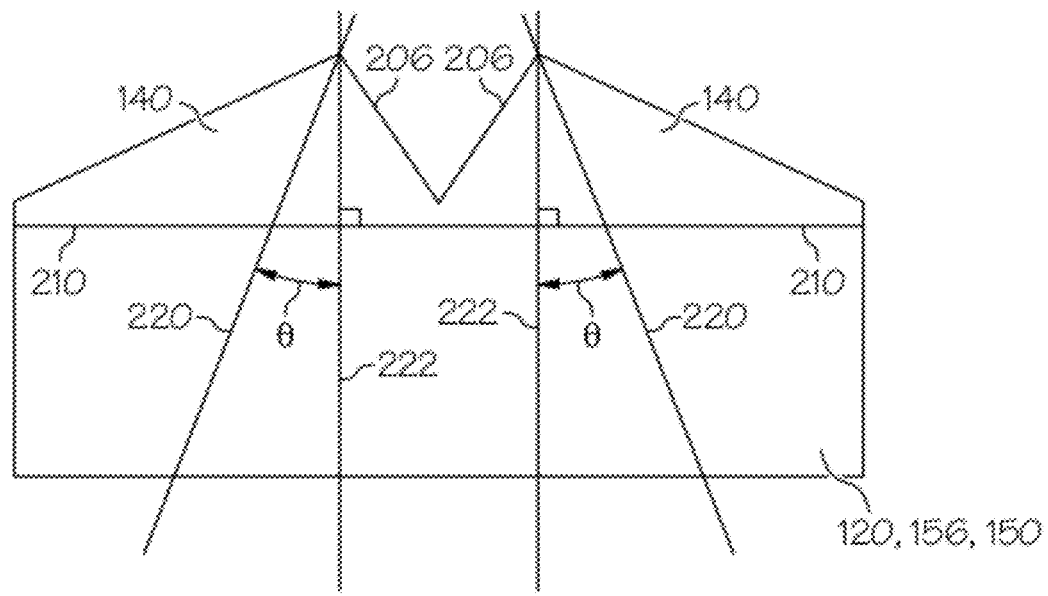
FIG. 8 is a cross-sectional view of FIG. 5 taken along line 9-9.

The array 200 may be replicated several times over, for example in approximately square tiles of a desired size. In the preferred embodiment, such tiles provided in a linear arrangement as illustrated in FIG. 7 whose longitudinal axis corresponds to the longitudinal axis of the strip of film 108 disposed around the border 106 of the position detection system 100 shown in FIG. 1. Sheeting with one tile or multiple tiles all having the same cube corner orientation is referred to as unpinned sheeting.

In prismatic films, a cube corner element is generally used with at least one other cube corner element as part of a matched pair and commonly is used with an array of such elements. Such an array is shown in FIGS. 5-7, and such a matched pair is shown in cross-section in FIG. 8. The cube corner elements illustrated in FIGS. 6 and 8 and repeated in the arrays of FIGS. 5 and 7 are preferably canted in the edge-more-parallel direction between about 8° and 24°, and are more preferably canted in the edge-more-parallel direction between about 12° and 20°. In a further exemplary embodiment the triangular cube corners elements are canted between −10° and −6° and in another embodiment between −15° and −6°. In the foregoing exemplary embodiments, each cube corner element is canted in the edge-more-parallel direction 15.5°. Additionally, each cube corner element preferably has a cube depth of between about 0.006 and 0.0055 and more preferably 0.002 and 0.0045 inches. In this exemplary embodiment, each cube corner element has a cube depth of 0.00325 inches.

As discussed above, one aspect of the present invention is directed to providing a retroreflective film that has a high brightness value. Accordingly, highly reflective prismatic sheeting is utilized to achieve this goal. However, the choice of prismatic sheeting potentially compromises the desire for uniformity. The geometry of a typical touch screen display is such that entrance angles range from 0 to 60 degrees. One of ordinary skill in the art will readily appreciate that this is a very large range over which to maintain uniform brightness with prismatic sheeting. Because observation angles also vary, particular care should be made in the selection of the cube geometry and size to achieve a combination of high brightness and good uniformity.

For prismatic sheeting applications, triangular cube corner prisms are most commonly used, because they can be directly machined into a substrate using conventional ruling or diamond turning techniques. An algorithm has been developed to simulate the signal brightness and uniformity as a function of geometry and size for isosceles triangular cube corners cut with equal groove depths. For these cube corners, the geometry and size are fully determined by two parameters: cube cant, and cube depth. One of ordinary skill in the art will readily appreciate that other types of triangular cube corners are possible, including for example, scalene triangles and bi-level or tri-level cutting of the groove sets. In these cases, it is not the cube cant/cube depth combination per se that determines signal brightness and uniformity, but rather the active aperture size for each direction of incident light.

The applicant has discovered that the brightness of the image of an interposing member 109 and the flanking shadows generated by the dual radiation sources 110, 112 can be enhanced if errors $e_1$, $e_2$, and $e_3$ of a particular pattern are deliberately incorporated into the normally 90° dihedral angles between the faces of the cube corners.

Figure 9:
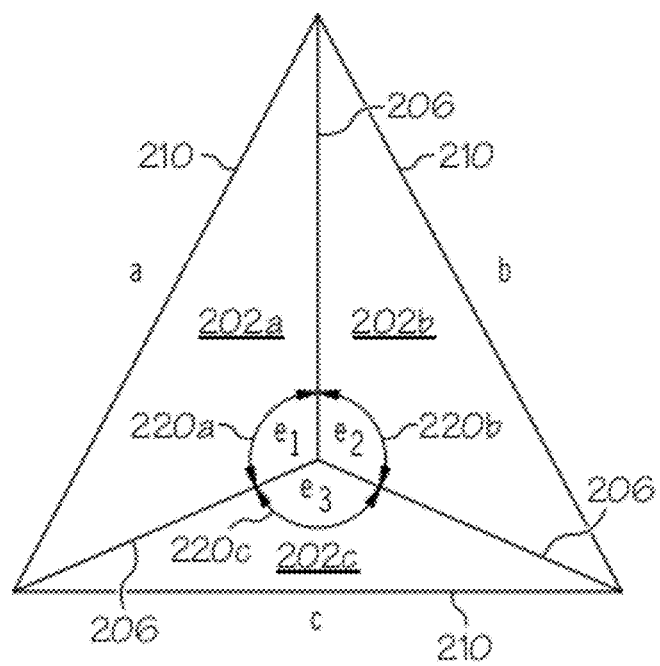
FIG. 9 illustrates the dihedral angle errors $e_1$, $e_2$, $e_3$ present on the faces of the cube corners of the invention.
Figure 10A:
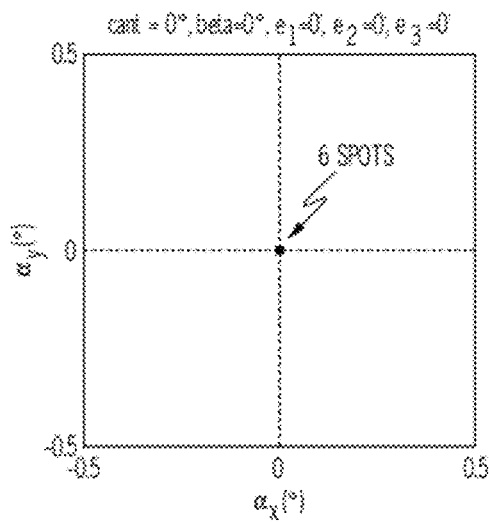
Figure 10B:
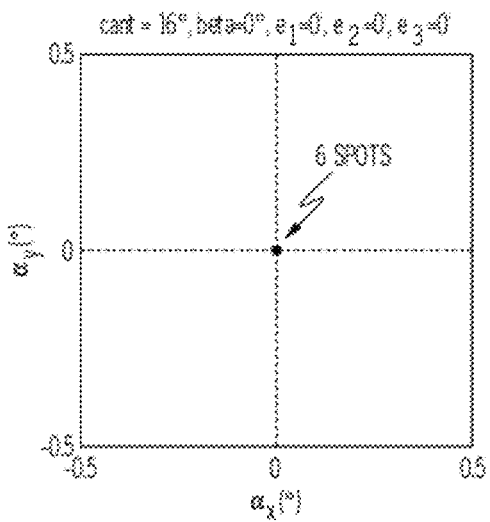
Figure 10C:
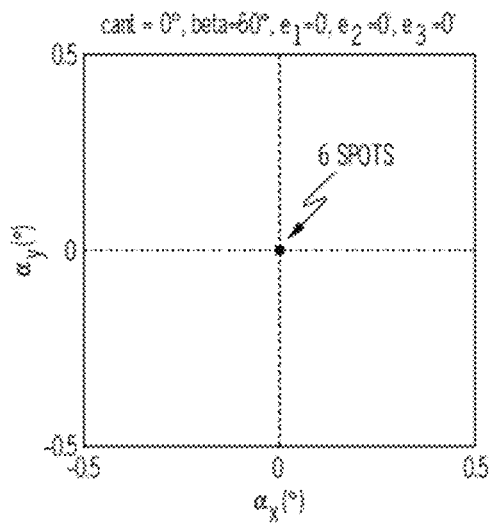
Figure 10D:
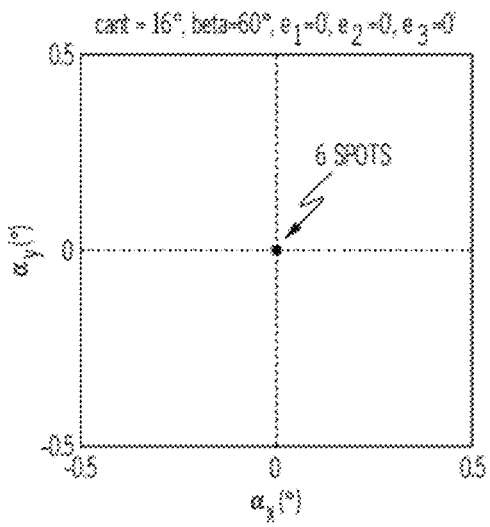
Figure 12B:
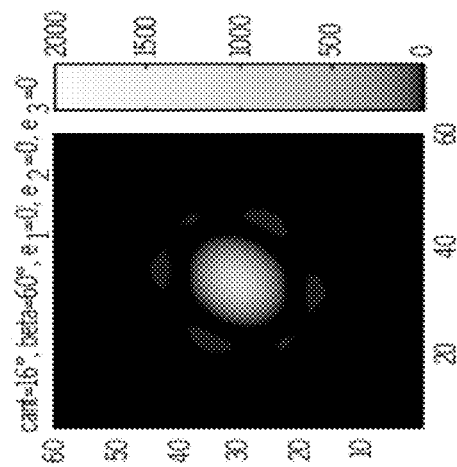
FIGS. 12B, 12D, 12F, 13B, 13D, 13F are simulated light return patterns generated by cube corners aberrated according to the instant of the invention canted edge more parallel at 0° and 16° for entrance angles (beta) of 0°, 60° and −8°.
Figure 12D:
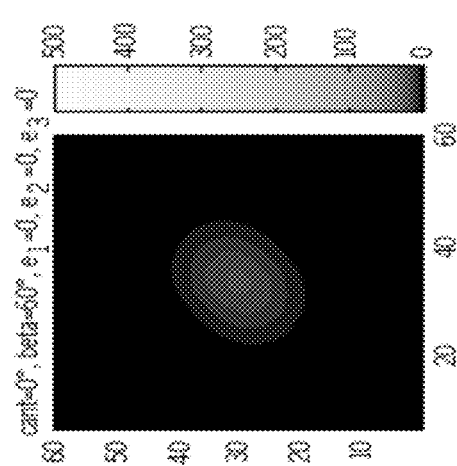
Figure 12A:
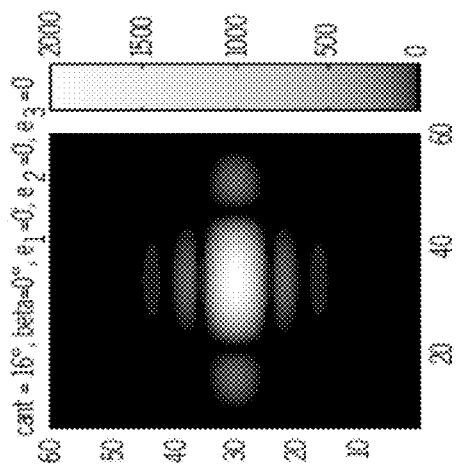
FIGS. 12A, 12C, 12E, 13A, 13C, 13E are simulated light return patterns generated by unaberrated conventional cube corners canted edge more parallel at 0° and 16° for entrance angles (beta) of 0°, 60° and −8°.
Figure 12C:
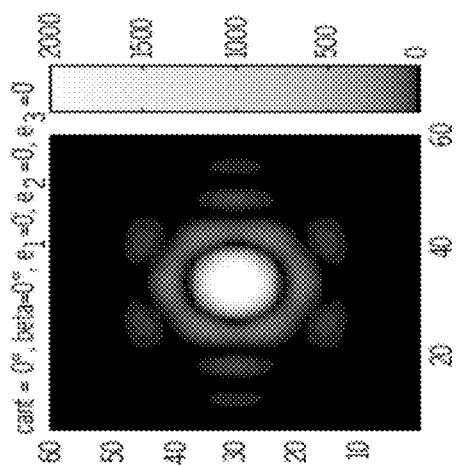
Figure 12F:
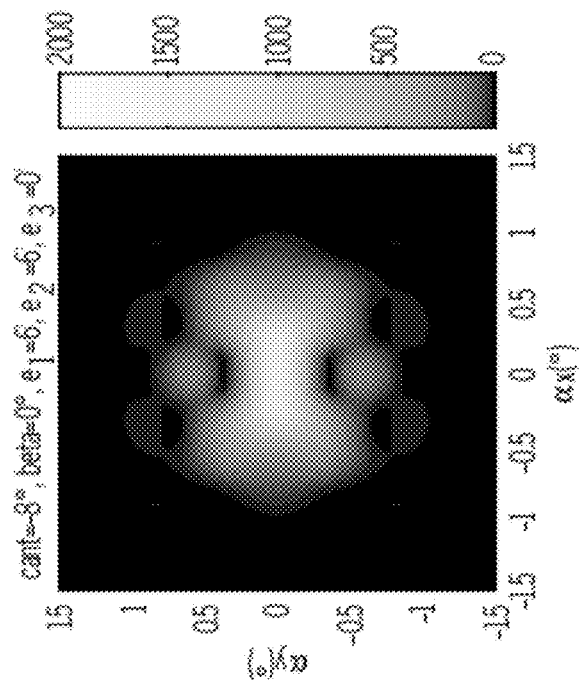
Figure 12E:
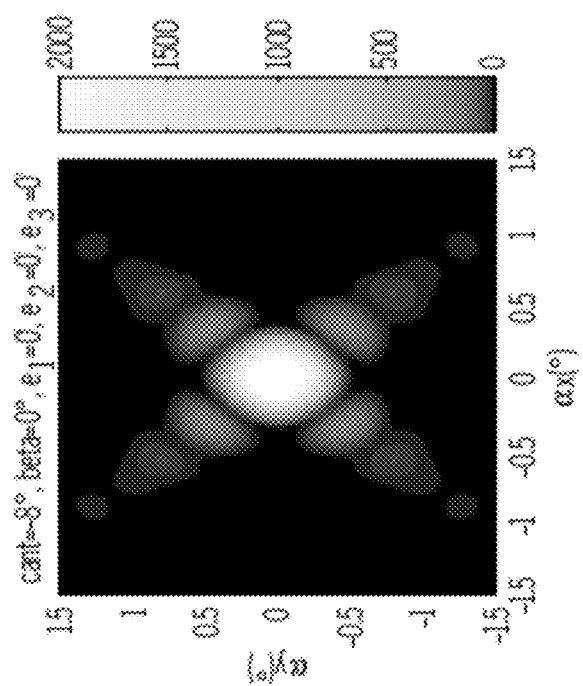

The pattern of errors $e_1$, $e_2$, and $e_3$ that forms part of this invention is best understood with respect to FIG. 9, which illustrates a single cube corner element having three triangular faces 202a, 202b and 202c. As explained with respect to FIG. 6, these faces 202a, 202b and 202c intersect to form three substantially dihedral edges 206 and three substantially dihedral angles $e_1$, $e_2$, and $e_3$ which represent the angles between faces 202b, 202c; 202a, 202c and 202a, 202b, respectively. In the cube corners of the invention, the dihedral angles each include a pattern of errors or departures $e_1$, $e_2$, and $e_3$ from the ideal 90° value such that $e_1 \approx e_2$, and $e_3 \approx 0$. Preferably, $|e_1|$ and $|e_2|$ are >0.033° (or 2 minutes) and $|e_3|$<0.033° (or 2 minutes). More preferably, $|e_1|$ and $|e_2|$ are between about 0.035° and 0.10°, and between about 0.03° and 0.20° and $|e_3|$ is about 0°. In the preferred embodiment, $|e_1|$ and $|e_2|$ are both 0.063° (or 3.8 minutes) while $|e_3|$ is 0°. In a still further preferred embodiment, $e_1$ and $e_2 \approx 0$; $(e_1+e_2)/2 > 0.03°$ and still more preferably $(e_1+e_2)/2 > 0.05°$. In a further embodiment, $e_3 < 0.03°$ and more preferably, where $e_3 < 0.015°$. In a further embodiment, $|e_1-e_2| < 0.06°$ and more preferably $|e_1-e_2| < 0.03°$.

One way such an error set may be achieved is by cutting the vee-grooves that form the opposing faces 202c of adjacent cube corner elements at an angle that has the effect of either increasing or decreasing the dihedral angles by 0.063°. These vee-grooves correspond to the horizontal vee-grooves of the cube corner array illustrated in FIGS. 5 and 7. However, such a technique would provide all of the cube corners with an error pattern having the same sign, i.e. $e_1$ and $e_2$ would all be either positive or negative, and the applicant has observed that the inclusion of both positive and negative assets of errors would advantageously reduce the sensitivity of film performance to dihedral angle variations that may arise during the manufacturing process. One method of achieving both positive and negative sets of dihedral angle errors is as follows. The cutter used to cut the horizontal grooves along the short sides of the triangles illustrated in FIGS. 5 and 7 is tilted in one direction. This causes an increase in $e_1$ and $e_2$ in the cube corner elements on one side of the cutter, and a corresponding decrease in $e_1$ and $e_2$ in the cube corner elements on the other side of the cutter. This tilted cutter is used to cut every other groove. Then the substrate is rotated 180° and the missing grooves are cut. This provides the resulting cube corner array with alternating rows of cube corners where $e_1$ and $e_2$ are +0.063° and −0.063°, respectively.

A comparison of the spot diagrams illustrated in FIGS. 10A-10H with those of FIGS. 11A-11D illustrate that an array of cube corners canted 0°, 16° and −8° edge-more-parallel and having the error pattern $e_1$, $e_2$, and $e_3$ of the invention advantageously contains the spread of light as much as possible within the plane of the touch-screen. When a cube corner is exposed to a point source of light, each of the three faces of the cube corner generates two retroreflected spots as a result of the fact that some of the light reflected off each face is in turn reflected off each of the other two cube faces. FIGS. 10A-10H are spot diagrams of conventional cube corners canted at 0° and 60° for entrance angles (beta) of 0° and 60°, wherein all of the dihedral angles are 90° (i.e. $e_1=e_2=e_3=0°$). FIGS. 10A-10H illustrate that, for all combinations of cant and entrance angle, all six of the retroreflected spots of the cube corner surfaces are accurately retroreflected 180° back to the point source of light such that they all converge onto the same x, y coordinates. By contrast, as is illustrated by FIGS. 11A-11D, when a pattern of dihedral angle errors $e_1=6$ min. $e_2=6$ min. and $e_3=0$ is introduced into the cube corners, the three faces of the cube corners do not retroreflect the six spots exactly 180° with respect to the point source, but instead retroreflect four of the six spots at divergent points (roughly 0.4°) along the x-axis. The remaining two spots are more compressed toward the x axis when the cube cant=16°. As the x-axis corresponds to the plane of the touch screen, FIGS. 11A-11D illustrate that cube corners incorporating the cant and dihedral angle error pattern of the invention advantageously contain the spread of light as much as possible within the plane of the touch-screen.

FIGS. 12A-12F and 13A-13F represent the anticipated retroreflected patterns of light when diffraction is taken into account. FIGS. 12A, 12C, 12E, 13A, 13C, 13E are light pattern diagrams for conventional cube corners canted at 0° and 60° for entrance angles (beta) of 0° and 60°, wherein all of the dihedral angles are 90° (i.e. $e_1=e_2=e_3=0°$). FIGS. 12B, 12D, 12F, 13B, 13D, 13F illustrate the differences in the light pattern diagrams of such cube corners when a pattern of dihedral angle errors $e_1=6$ min. $e_2=6$ min. and $e_3=0$ is introduced into them. In general, the retroreflected light is more concentrated along the x-axis, as is best seen with respect to FIGS. 13B, 13D, 13F. A comparison of these diagrams confirms the conclusions reached with respect to FIGS. 10A-11D and FIGS. 11A-11D, i.e. that cube corners incorporating the cant and dihedral angle error pattern of the invention advantageously contain the spread of light as much as possible within the plane of the touch-screen.

Figure 13A:
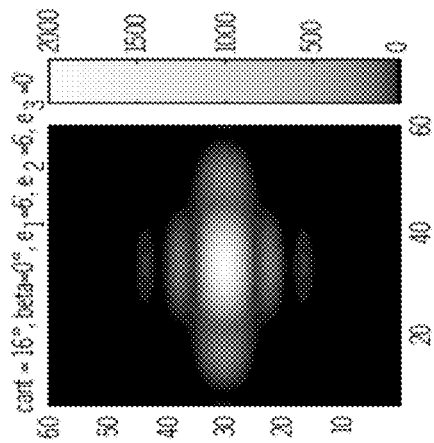
Figure 13B:
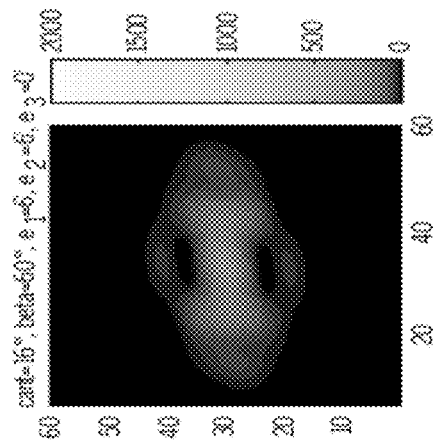
Figure 13C:
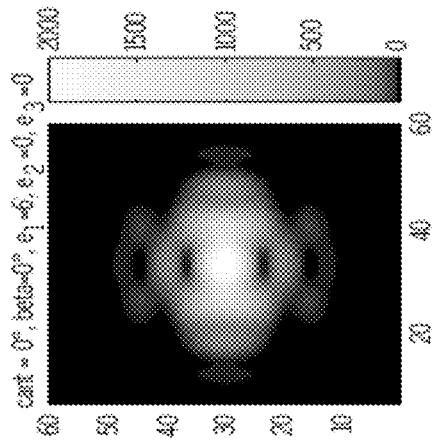
Figure 13D:
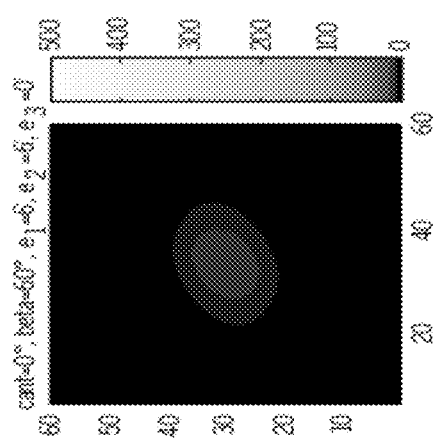
Figure 13F:
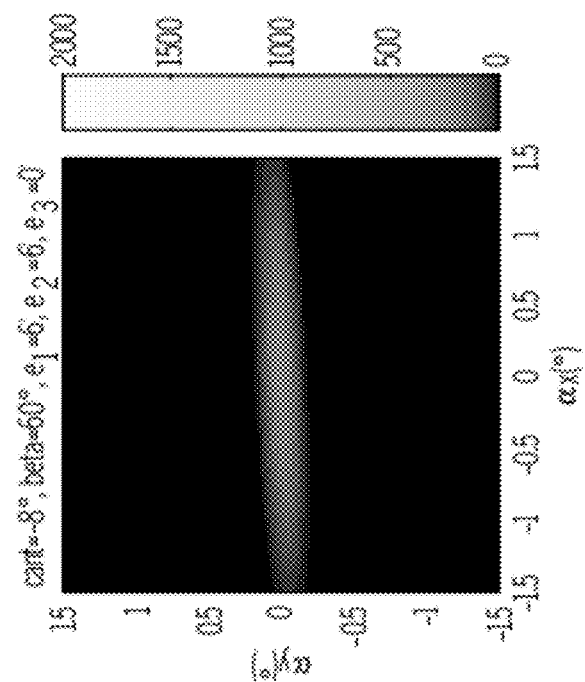
Figure 13E:
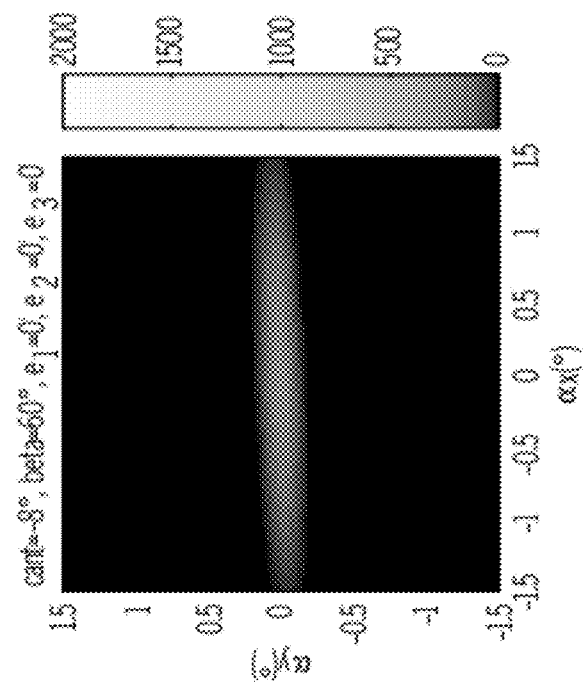

As provided in FIGS. 13B, 13D, 13F the unpinned prismatic film includes a plurality of triangular cube corner retroreflective elements in which the light source when reflected produces a pattern of light having a horizontal spread greater than a vertical spread. The horizontal spread is at least 1.5 times greater at entrance angles of 0° and 60° and the total light return at 60° is at least 10% of light return at 0° and in certain cases greater than 30%.

Figure 14:
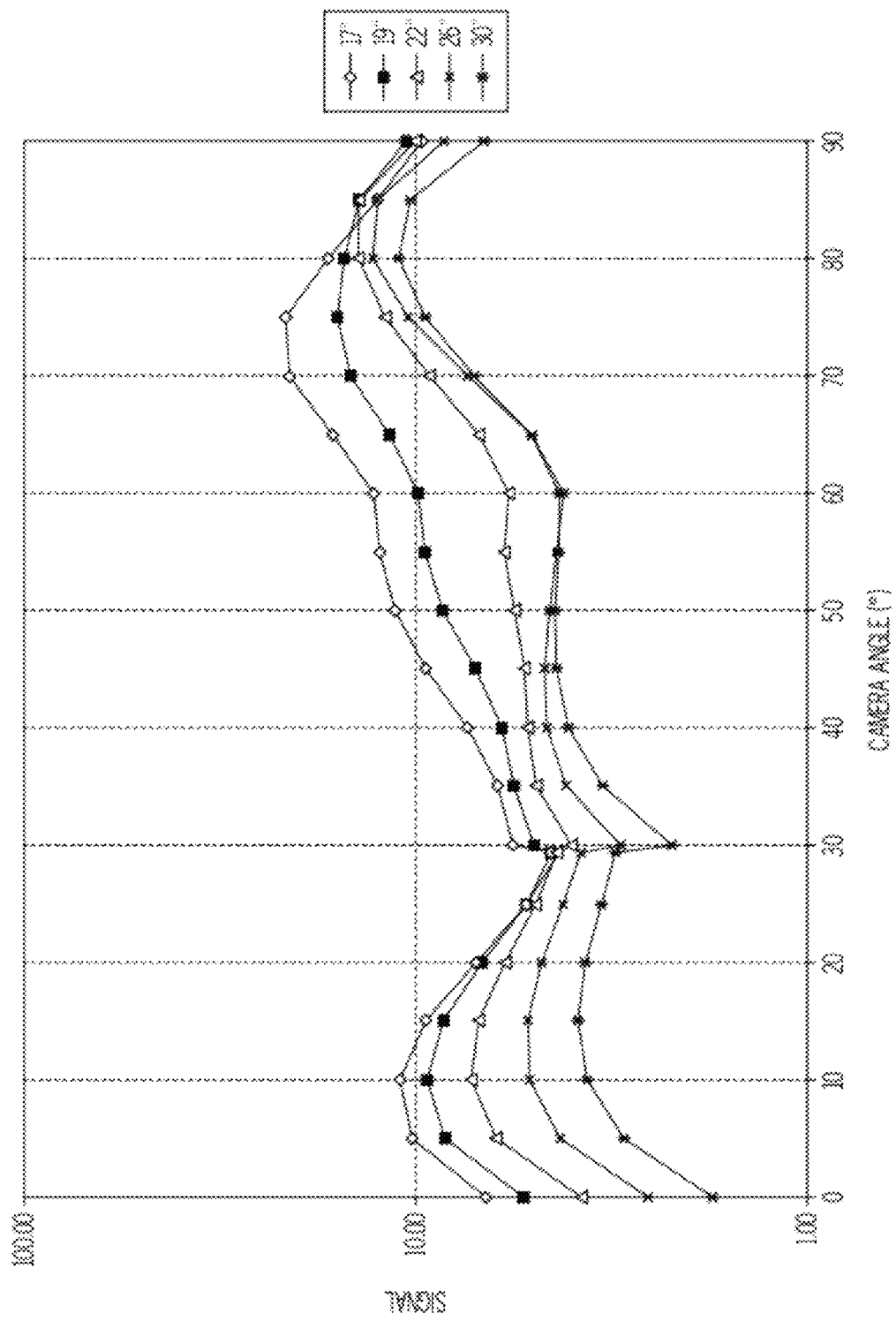
FIG. 14 is an exemplary plot of camera signal for different screen sizes having a 16/9 aspect ratio.

Finally, FIG. 14 is an exemplary plot of camera signal for different screen sizes having a 16/9 aspect ratio. As is evident in the graph, for screen sizes of 17 inches, 19 inches, 22 inches, 26 inches and 30 inches, the minimum signal strength at never falls below about 2.0 while the maximum signal strength may be as high as 30.0 over an observation angle of 90°. Hence the retroreflective material of the invention provides sufficient retroreflection over a 90° angle to generate an easily detectible signal in the cameras used in the preferred embodiment.

It will thus be seen according to the present invention a highly advantageous prismatic film for use with touch screen and position sensing systems has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

Publications, patents and patent applications are referred to throughout this disclosure. All references cited herein are hereby incorporated by reference.

What is claimed is:

1. A position detection system comprising:
    a camera positioned to receive electromagnetic radiation traversing a detection area that generates a signal representative of an image;
    a dual source of electromagnetic radiation positioned adjacent to said camera for outputting electromagnetic radiation that overlaps over at least a portion of a detection area, and
    a prismatic film positioned along a periphery of at least a portion of the detection area that retroreflects said electromagnetic radiation from said source to said camera, wherein the prismatic film includes a plurality of individual triangular cube corner retroreflective elements having dihedral angle errors $e_1$, $e_2$, and $e_3$ such that $e_1 \approx e_2 \neq 0$ and $e_3 \approx 0$, and wherein $e_1$ and $e_2$ are either both positive or both negative in each individual triangular cube corner element.

2. The system of claim 1, wherein the source of electromagnetic radiation is a pair of IR emitters.

3. The system of claim 1, wherein $|e_1|$ and $|e_2|$ are between 0.03° and 0.20°.

4. The system of claim 1, wherein said plurality of triangular cube corner elements are canted between 8° and 24°.

5. The system of claim 1, wherein said triangular cube corner retroreflective elements have a cube depth of between 0.002 and 0.0055 inches.

6. A prismatic film, comprising:
an unpinned prismatic film having a retroreflective substrate including a plurality of individual triangular cube corner retroreflective elements, and
wherein the retroreflective cube corner elements have dihedral angle errors $e_1$, $e_2$, and $e_3$ such that $e_1 \approx e_2 \approx 0$ and $e_3 \approx 0$,
wherein each retroreflective cube corner element is defined by a plurality of grooves each having a fixed depth, and
wherein $e_1$ and $e_2$ are either both positive or both negative in each individual triangular cube corner element.

7. The prismatic film of claim 6, further comprising a metallized layer disposed over at least a portion of the cube corner retroreflective elements.

8. The prismatic film of claim 7, wherein the film is transparent for infra-red light, but is non-transparent for visible light.

9. The prismatic film of claim 7, wherein the metallized layer is formed from one of aluminum and gold.

10. The prismatic film of claim 6, wherein said plurality of triangular cube corner elements are canted between 12° and 20°.

11. The prismatic film of claim 6, wherein said plurality of triangular cube corner elements is canted edge-more-parallel.

12. The prismatic film of claim 6, wherein about half of the plurality of triangular cube corner retroreflective elements have dihedral angle errors $e_1$ and $e_2$ between 0.03° and 0.20° and the remaining half of the plurality of triangular cube corner retroreflective elements have dihedral angle errors $e_1$ and $e_2$ between −0.03° and −0.20°.

13. The prismatic film of claim 6, wherein said triangular cube corner retroreflective elements have a cube depth of between 0.002 and 0.0055 inches.

14. The prismatic film of claim 6, wherein the first substrate has been dyed with an infra-red dye and appears black in visible light.

15. The prismatic film of claim 6 wherein $|e_1−e_2|/2>0.03°$.

16. The prismatic film of claim 6 wherein $|e_1−e_2|/2>0.05°$.

17. The prismatic film of claim 6 wherein $e_3<0.05°$.

18. The prismatic film of claim 6 wherein $e3<0.025°$.

19. The prismatic film of claim 6 wherein $e1−e2<0.06°$.

20. The prismatic film of claim 6 wherein $e1−e2<0.03°$.

21. A prismatic film, comprising;
an unpinned prismatic film having a retroreflective substrate including a plurality of individual triangular cube corner retroreflective elements;
a light source including a pair of point source infrared light emitting diodes;
wherein the light source when reflected produces a pattern of light having a horizontal spread greater than a vertical spread at entrance angles of 0° and 60°;
wherein the triangular cube corner retroreflective elements have dihedral angle errors $e_1$, $e_2$, and $e_3$ such that $e_1 \approx e_2 \neq 0$ and $e_3 \approx 0$; and
wherein $e_1$ and $e_2$ are either both positive or both negative in each individual triangular cube corner element.

22. A prismatic film as recited in claim 21, wherein the horizontal spread is at least 1.5 times greater than the vertical spread at entrance angles of 0° and 60°.

23. A prismatic film as recited in claim 22, wherein total light return at 60° is at least 10% of light return at 0°.

24. A prismatic film as recited in claim 21, wherein the total light return at 60° is at least 30% of light return at 0°.

25. A prismatic film as recited in claim 21, wherein the triangular cube corners elements are canted between −10° and −6°.

26. A position detection system comprising:
a camera positioned to receive electromagnetic radiation traversing a detection area that generates a signal representative of an image;
a dual source of electromagnetic radiation positioned adjacent to said camera for outputting electromagnetic radiation that overlaps over at least a portion of a detection area, and
a prismatic film positioned along a periphery of at least a portion of the detection area that retroreflects said electromagnetic radiation from said source to said camera, wherein the prismatic film includes a plurality of individual triangular cube corner retroreflective elements and the radiation source when reflected produces a pattern of light having a horizontal spread greater than a vertical spread at entrance angles of 0° and 60°;
wherein the triangular cube corner retroreflective elements have dihedral angle errors $e_1$, $e_2$, and $e_3$ such that $e_1 \approx e_2 \neq 0$ and $e_3 \approx 0$; and
wherein $e_1$ and $e_2$ are either both positive or both negative in each individual triangular cube corner element.

27. A prismatic film, comprising:
an unpinned prismatic film having a retroreflective substrate including a plurality of triangular cube corner retroreflective elements,
wherein the retroreflective cube corner elements have dihedral angle errors $e_1$, $e_2$, and $e_3$ such that $e_1 \approx e_2 \neq 0$ and $e_3 \approx 0$, wherein the plurality of triangular cube corner elements are canted between −15° and −6°,
wherein each retroreflective cube corner element is defined by a plurality of grooves each having a fixed depth, and
wherein $e_1$ and $e_2$ are either both positive or both negative in each individual triangular cube corner element.

28. A prismatic film as recited in claim 27, wherein the plurality of triangular cube corner elements are canted between −10° and −6°.

* * * * *